United States Patent [19]
Yamamoto et al.

[11] Patent Number: 6,071,070
[45] Date of Patent: Jun. 6, 2000

[54] AIR-CONDITIONING EQUIPMENT FOR VEHICLES

[75] Inventors: Kazuhiro Yamamoto; Toshiki Hakata, both of Higashihiroshima; Satoshi Otani, Izumo, all of Japan

[73] Assignee: Japan Climate Systems Corporation, Hiroshima-ken, Japan

[21] Appl. No.: 08/825,731

[22] Filed: Apr. 2, 1997

[30]       Foreign Application Priority Data

Aug. 5, 1996 [JP] Japan ..................................... 8-205701
Aug. 5, 1996 [JP] Japan ..................................... 8-205703

[51] Int. Cl.[7] ....................................................... F04D 5/00
[52] U.S. Cl. ............................. 415/53.1; 62/244; 454/137
[58] Field of Search .............................. 62/244; 415/53.1, 415/53.3; 454/137, 155

[56]                  References Cited
                FOREIGN PATENT DOCUMENTS 1-317819  12/1989  Japan .

*Primary Examiner*—Harold Joyce
*Attorney, Agent, or Firm*—Morrison & Foerster LLP

[57]                  ABSTRACT

In a casing (11), a rear guide (23) is formed above a cylindrical impeller (13) and a stabilizer (24) is formed below the impeller. A minimum gap dimension between the cylindrical impeller (13) and the stabilizer (24) on the outlet port (17) side has a value of 14% to 24% of the outer diameter of the cylindrical impeller (13). An angle between a straight line connecting the center of rotation of the cylindrical impeller (13) and a minimum gap position on the outlet port (17) side of the stabilizer (24) and the horizontal plane has a value of 38° to 43°. A minimum gap dimension between the cylindrical impeller (13) and the stabilizer (24) on the inlet port (16) side has a value of not smaller than 7% of the outer diameter of the cylindrical impeller (13). An angle between a straight line connecting the center of rotation of the cylindrical impeller (13) and a minimum gap position on the inlet port (16) side of the stabilizer (24) and the vertical plane has a value of 11° to 15°.

7 Claims, 7 Drawing Sheets

PRIOR ART

AIR-CONDITIONING EQUIPMENT FOR VEHICLES

BACKGROUND OF THE INVENTION

The present invention relates to air-conditioning equipment for vehicles, and in particular, to air-conditioning equipment for vehicles, which is applied to cooling, heating, air cleaning and the like for the rear seat, provided on the ceiling surface of a vehicle.

Conventionally, for example, as air-conditioning equipment for the rear seat of a vehicle such as a one-box car or the like, there has been, for example, one which is provided on the ceiling surface and has the following construction (see Japanese Patent Laid-Open Publication No. HEI 1-317819, for example).

According to this air-conditioning equipment for vehicles, as shown in FIG. 11, an inlet port 2 and an outlet port 3 are formed in positions approximately opposite from each other in a casing 1, and a cylindrical impeller 4 is provided inside. On an inner surface of a lower portion of the casing 1 is provided a stabilizer 5 for forming a specified gap between the surface and the cylindrical impeller 4. The shape of the stabilizer 5 is very important in terms of air blowing efficiency and so forth when generating an air flow in an approximately linear direction by the cylindrical impeller 4. For the above reasons, the stabilizer 5 has a construction in which it protrudes in a manner that it comes close to the cylindrical impeller 4 on the inlet port 2 side and the outlet port 3 side and has a recess portion 6 between them, so that angles "a" and "b" between straight lines which connect the center of rotation of the cylindrical impeller 4 and the end portions of the stabilizer 5 and the horizontal plane and the vertical plane fall within respective specified ranges.

Furthermore, in the aforementioned air-conditioning equipment for vehicles, the inlet port and the outlet port are formed in positions approximately opposite from each other in the casing. Inside the casing is provided the cylindrical impeller, and a rear guide and the stabilizer for forming specified spaces between them and the cylindrical impeller are formed on the upper and lower inner surfaces, respectively. On the outlet port side is formed an outlet passage by the casing, the rear guide and the stabilizer. In this outlet passage is pivotally provided a deflecting vane around a pivot axis arranged in a widthwise direction, allowing the direction of air blow to be changed.

However, the aforementioned air-conditioning equipment for vehicles has not sufficiently taken into consideration a surging noise and a whistle noise generated as a consequence of an increase of a ventilation resistance occurring when a cooling performance is improved by reducing a fin pitch (a sectional area in which air can flow) of an evaporator 7, increasing a core thickness (the thickness of a portion through which air passes) or taking a similar measure. That is, the aforementioned air-conditioning equipment for vehicles has merely attempted to increase the fan efficiency by confining the aforementioned angles "a" and "b" in the specified ranges, and the attempt is insufficient in preventing the occurrence of the whistle noise and the surging noise.

Furthermore, in the aforementioned air-conditioning equipment for vehicles, the deflecting vane is provided in the air flow. Therefore, the ventilation resistance increases accordingly as the inclination of the vane relative to the direction of air flow increases, and this becomes a cause for generating a ventilation noise.

Accordingly, it is an object of the present invention to provide air-conditioning equipment for vehicles capable of improving the air blowing performance in the case where the ventilation resistance is increased while maintaining a favorable air blowing state, reducing the occurrence of noises in the air blowing stage and smoothly changing the direction of air blow.

SUMMARY OF THE INVENTION

In order to achieve the aforementioned object, the present invention provides air-conditioning equipment for vehicles, of which casing having an inlet port and an outlet port that are arranged in positions approximately opposite from each other is internally provided with a cylindrical impeller arranged horizontally perpendicularly to a direction in which the inlet port and the outlet port are connected, a rear guide formed above the cylindrical impeller and a stabilizer formed below the cylindrical impeller, wherein a minimum gap dimension t1 between the cylindrical impeller and the stabilizer on the outlet port side, an angle "a" between a straight line connecting a center of rotation of the cylindrical impeller and a minimum gap position on the outlet port side of the stabilizer and a horizontal plane, a minimum gap dimension t2 between the cylindrical impeller and the stabilizer on the inlet port side, and an angle "b" between a straight line connecting the center of rotation of the cylindrical impeller and a minimum gap position on the inlet port side of the stabilizer and a vertical plane have values capable of preventing occurrence of a whistle noise and a surging noise. In this case, the whistle noise and the surging noise each mean a noise in the audible range (about 16 to 20 Hz through 16 to 20 kHz).

Thus, according to the air-conditioning equipment for vehicles of the present invention, not only the positional relation between the center of rotation of the cylindrical impeller and the specified positions of the stabilizer but also the gap dimensions are taken into consideration. Therefore, it is allowed to apply a ventilation resistance greater than that of the prior art while maintaining an appropriate air flow rate and surely prevent the whistle noise and the surging noise generated in company with the rotation of the cylindrical impeller, so that a favorable air-conditioning environment can be achieved.

A range in which an appropriate air flow rate can be maintained with the occurrence of the whistle noise and the surging noise prevented, it is preferred that the dimension t1 is not smaller than 14% and not greater than 24% of the outer diameter of the cylindrical impeller, the angle "a" is not smaller than 38° and not greater than 43°, the dimension t2 is not smaller than 7% and not greater than 13% of the outer diameter of the cylindrical impeller, and the angle "b" is not smaller than 11° and not greater than 15°. In this case, the optimum value is the middle value in each range.

Furthermore, it is preferred that the stabilizer is provided with a concave surface which is centered about a position below the center of rotation of the cylindrical impeller in a middle portion except for the outlet port side and the inlet port side and has an arc-like section shape having a radius of curvature smaller than the radius of the cylindrical impeller and a gap of 15% to 25% of the outer diameter of the cylindrical impeller.

Furthermore, it is preferred that the stabilizer has a sectionally arc-shaped top portion having a radius of curvature of 5 to 23% of the outer diameter of the cylindrical impeller on the outlet port side.

Furthermore, the stabilizer has the concave surface which is centered about the position below the center of rotation of the cylindrical impeller in the middle portion except for the outlet port side and the inlet port side and has the arc-like section shape having a radius of curvature smaller than the radius of the cylindrical impeller and the gap of 15% to 25% of the outer diameter of the cylindrical impeller, and therefore, an efficient appropriate air flow rate can be obtained.

Furthermore, the sectionally arc-shaped top portion having a radius of curvature of 8 to 18% of the outer diameter of the cylindrical impeller is formed on the outlet port side of the stabilizer, and therefore, it is allowed to prevent the possible occurrence of a whistle noise and a surging noise while maintaining a more appropriate air flow rate.

Furthermore, in order to achieve the aforementioned object, the present invention provides air-conditioning equipment for vehicles, of which casing having an inlet port and an outlet port that are arranged in positions approximately opposite from each other is internally provided with a cylindrical impeller arranged horizontally perpendicularly to a direction in which the inlet port and the outlet port are connected, a rear guide formed above the cylindrical impeller and a stabilizer formed below the cylindrical impeller, wherein a portion or the outlet port side of at least one of the rear guide and the stabilizer is provided by a diffuser which can change the direction of air blow by pivoting around a pivot axis.

As described above, according to the air-conditioning equipment for vehicles of the present invention, the direction of the air passage itself is changed by pivoting the diffuser. With this arrangement, there is no apprehension for the occurrence of a ventilation noise as in the case where the deflecting vane is provided in the air flow, so that the deflection of the direction of air flow can be performed smoothly.

It is acceptable to form the diffuser on both the rear guide and the stabilizer and make them interlock with each other.

It is preferred that the diffuser can change the direction of air blow by pivoting automatically according to an air blow mode.

The diffuser may be formed as divided into two or more parts in the lengthwise direction, and at least diffusers arranged parallel in the lengthwise direction are allowed to pivot independently of each other around respective pivot axes.

DETAILED DESCRIPTION OF THE PREFERRED EMBODIMENT

An embodiment of the present invention will be described below with reference to the accompanying drawings.

Figure 1:
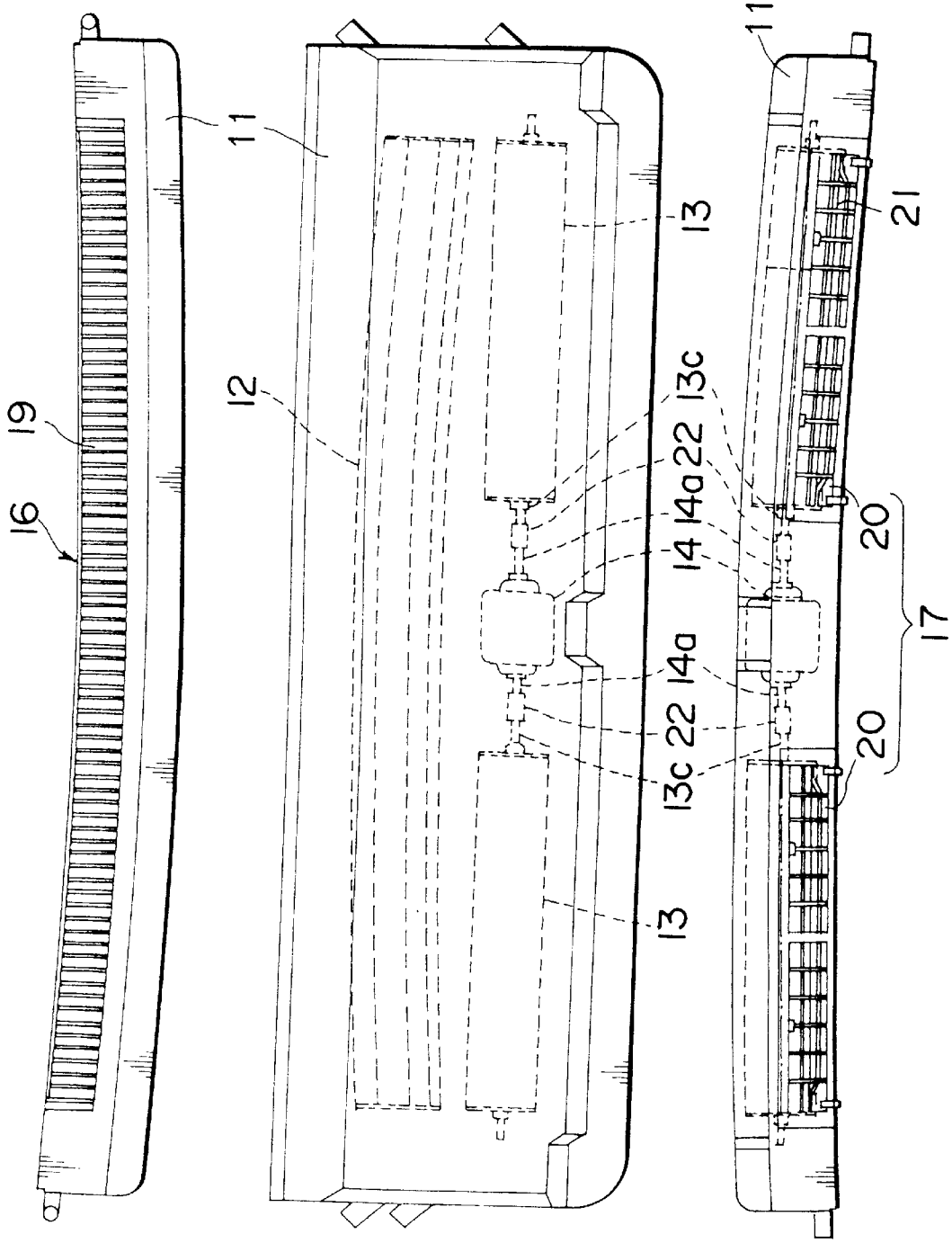
FIGS. 1A, 1B and 1C are respectively a rear view, a plan view and a front view of air-conditioning equipment for vehicles according to the present invention.
Figure 2:
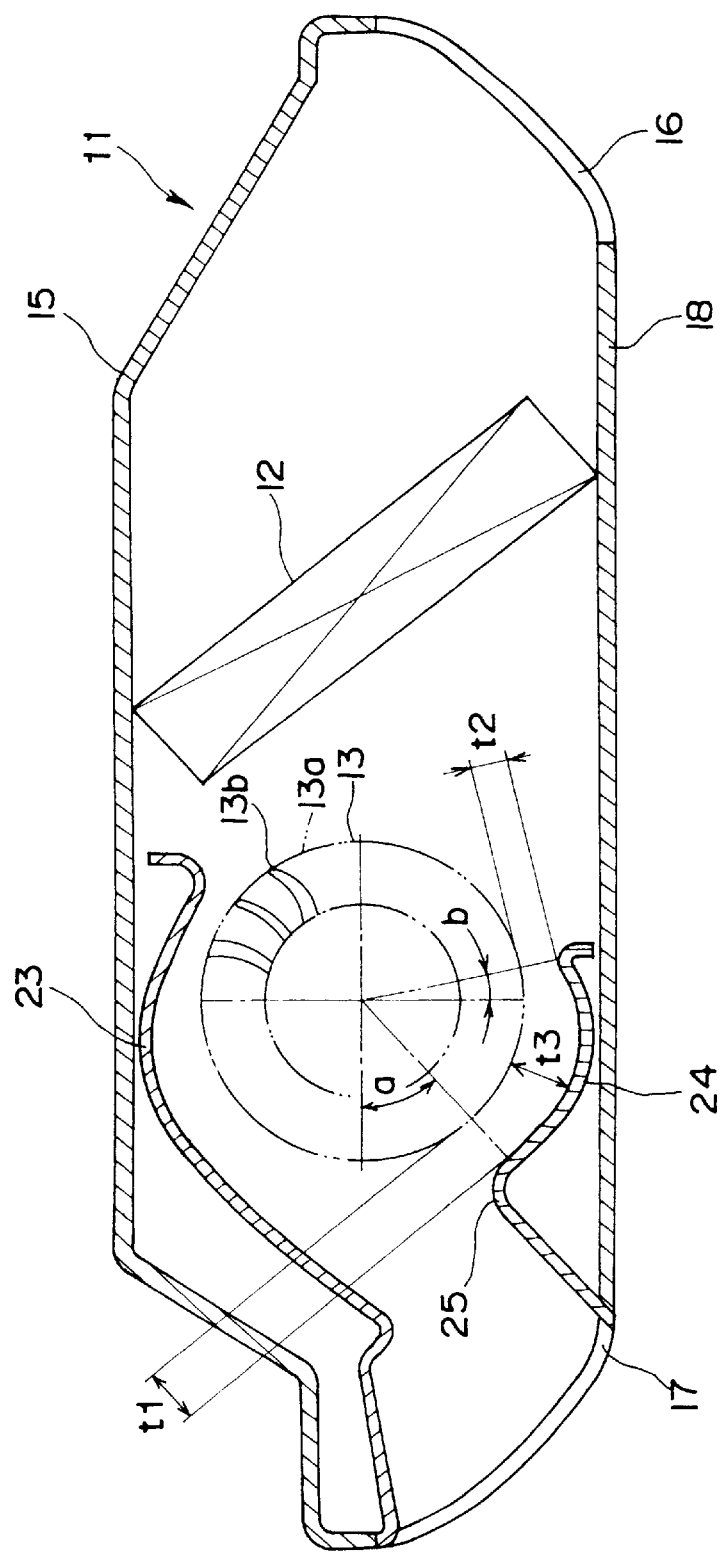
FIG. 2 is a sectional view of FIG. 1.

The air-conditioning equipment for vehicles shown in FIGS. 1 and 2 has a construction in which an evaporator 12, a pair of cylindrical impellers 13 and a motor 14 for driving both the cylindrical impellers 13 are provided inside a casing 11.

The casing 11 is comprised of an upper casing 15 fixed to a ceiling surface of an automobile or the like and a lower casing 18 in which an inlet port 16 and an outlet port 17 are formed in positions approximately opposite from each other. The inlet port 16 is constructed by arranging a plurality of elongate slits 19. The outlet port 17 is comprised of openings 20 located apart laterally in two portions. Each opening 20 is divided in the widthwise direction by a plurality of deflecting plates 21. The deflecting plates 21 pivot around respective pivot axes (not shown) as interlocked with each other and operate to change the direction of air flow.

The evaporator 12 is a conventionally known one for cooling the air that is passing through it, and it is arranged on the inlet port 16 side. When used in an automobile as described above, this evaporator 12 is connected in parallel with an automobile interior side heat exchanger in the middle of a refrigerating cycle formed by connecting a compressor, a throttle valve, the automobile interior side heat exchanger and an automobile exterior side heat exchanger in an annular configuration.

Each cylindrical impeller 13 has a conventionally known construction in which a plurality of curved vanes 13b are arranged side by side in the circumferential direction between a plurality of disks 13a (there are also ones having a donuts-like shape except for those located in both end portions) arranged at regular intervals.

The motor 14 has a construction in which it has rotary shafts 14a at both ends and the rotary shafts 14a are connected to rotary shafts 13c of the respective cylindrical impellers 13 via joints 22.

On the inner surfaces of the upper casing 15 and the lower casing 18 are respectively formed a rear guide 23 and a stabilizer 24 for forming gaps between them and the circumferences of the cylindrical impellers 13. The rear guide 23 is formed in a manner that a gap dimension between it and the cylindrical impellers 13 is gradually increased toward the outlet port 17 side.

On the other hand, the stabilizer 24 is formed so that the portions shown in FIG. 2 come to have values determined by an experiment as described later. It is to be noted that t1 is a minimum gap dimension between the center of rotation of each cylindrical impeller 13 and the stabilizer on the outlet port 17 side, "a" is an angle between a straight line connecting the minimum gap position and the center of rotation of the cylindrical impeller 13 and the horizontal plane, t2 is a minimum gap dimension between the center of rotation of each cylindrical impeller 13 and the stabilizer on the inlet port 16 side, "b" is an angle between a straight line connecting the minimum gap position and the center of rotation of the cylindrical impeller 13 and the vertical plane, and t3 is a gap dimension in a position in which a distance from the center of rotation of each cylindrical impeller 13 is at its maximum in a middle portion except for the outlet port 17 side and the inlet port 16 side. Further, according to the experiment, the outer diameter of each cylindrical impeller 13 was set to 60 mm, its length was set to 330 mm, its rotating speed was set to 3000 rpm (constant), and the ventilation resistance of the evaporator 12 was set to 3 mmAq (when the air flow rate was 1 m/s).

First, the dimensions t1 and t2 were set in a range in which neither whistle noise nor surging noise occurred and the air flow rate was maintained at 450 $m^3$ or higher. It is to be noted that the other values were set to values out of the range in which the whistle noise and the surging noise consistently occur when t1 and t2 were changed. In this case, the experiment was performed by setting "a" to 40.5°, "b" to 13° and t3 to 12 mm.

Figure 3:
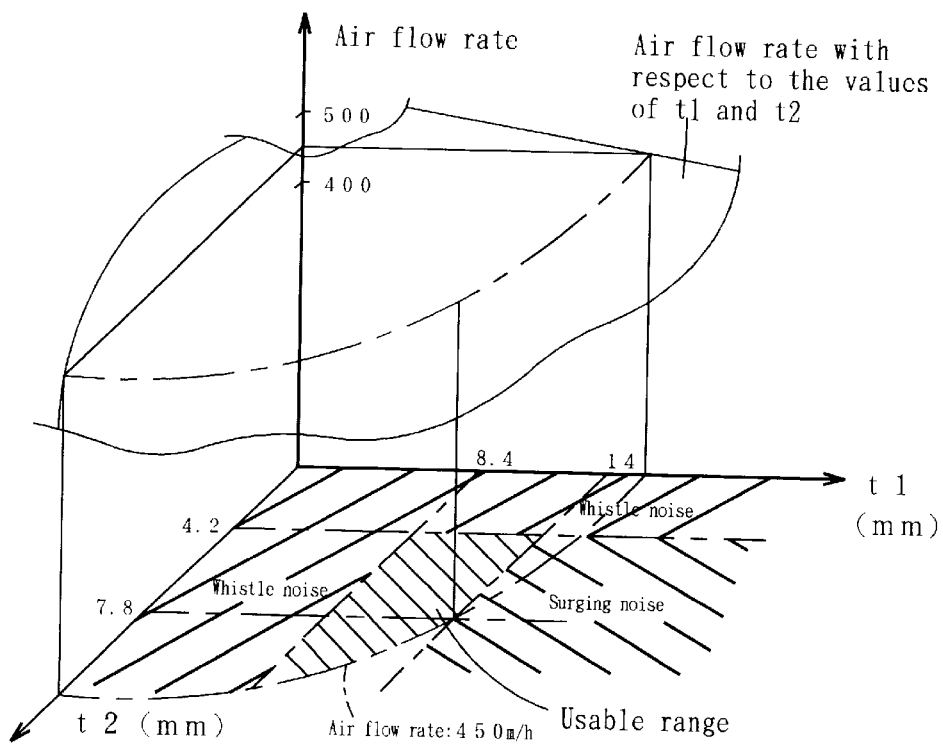
FIG. 3 is a graph showing a relation between t1 and t2 and an air flow rate.

The experiment result is as shown in the graph of FIG. 3. When the experiment was performed under the aforementioned conditions, the result of plotting the air flow rate obtained by changing the values of t1 and t2 is the curved plane shown as the "air flow rate with respect to the values of t1 and t2". In this curved plane, the position in which the air flow rate is 450 $m^3/h$ is indicated by the one-dot chain line.

As is apparent from the experiment result, neither whistle noise nor surging noise occurred when t1 was in the range of 8.5 mm to 14 mm and t2 was not smaller than 4.2 mm. It is to be noted that the values of t1 and t2 at which neither whistle noise nor surging noise occurs are the values which vary according to the difference of the outer diameter of the cylindrical impeller 13. As a result of repeating the experiment by changing the outer diameter of the cylindrical impeller 13, the occurrence of the whistle noise and the surging noise was able to be prevented by setting them to 14% to 24% and not smaller than 7% of the outer diameter dimension, respectively.

Furthermore, in regard to the dimension t1, the air flow rate was able to be maintained at 450 $m^3/h$ or higher in the aforementioned range, whereas the air flow rate was not able to be maintained when the dimension t2 exceeded the range of 7.8 mm to 9.5 mm. Therefore, it was determined that the dimension t2 was not smaller than 4.2 mm and not greater than 7.8 mm, i.e., not smaller than 7% and not greater than 13% of the outer diameter dimension taking the difference of the outer diameter dimension of the cylindrical impeller 13 into consideration.

Figure 4:
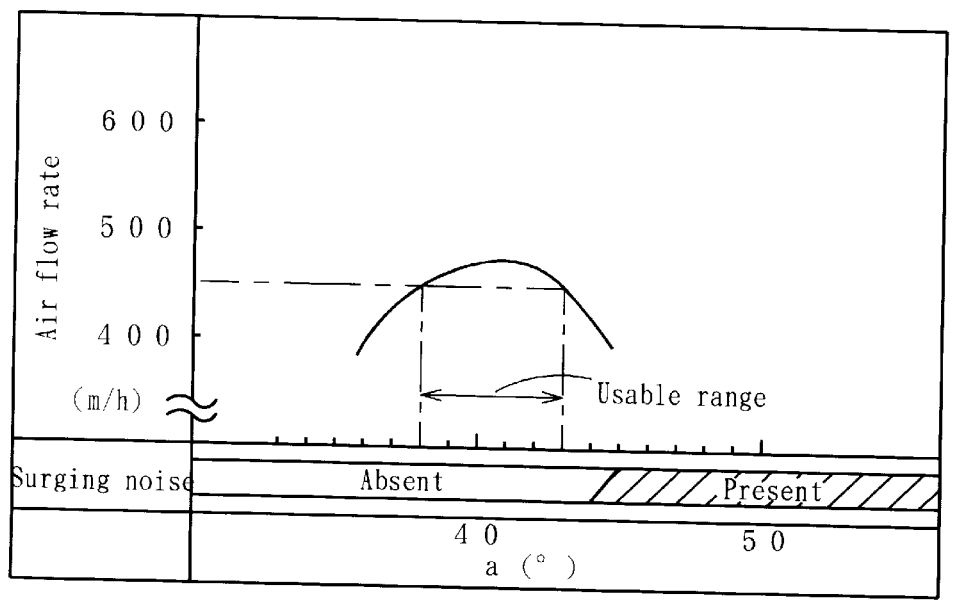
FIG. 4 is a graph showing a relation between "a" and the air flow rate.
Figure 5:
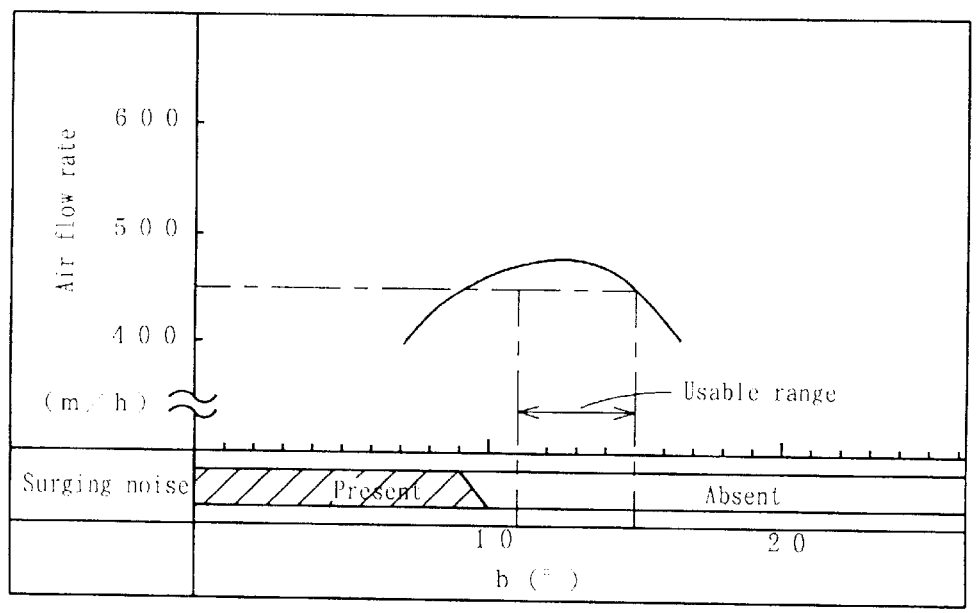
FIG. 5 is a graph showing a relation between "b" and the air flow rate.
Figure 6:
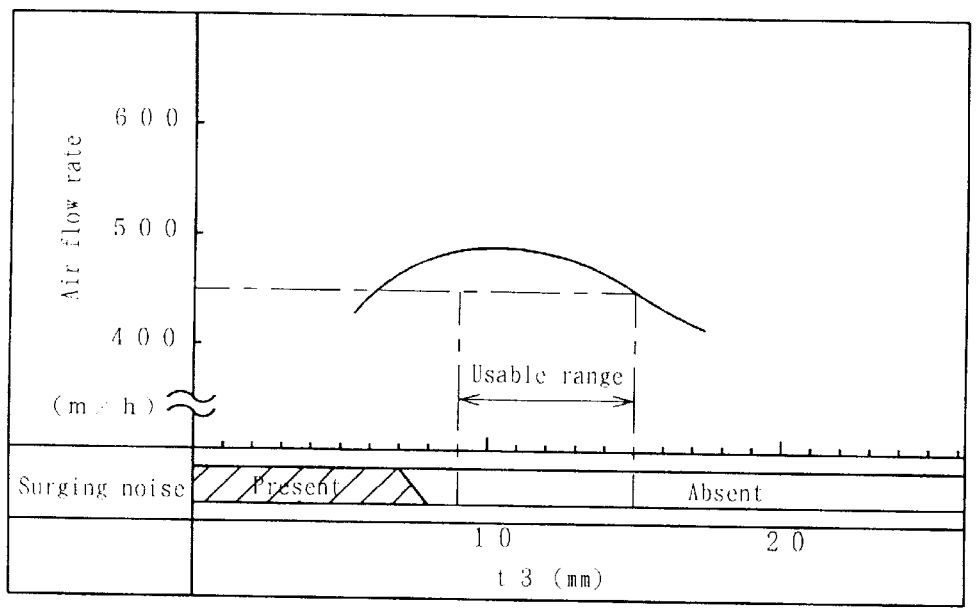
FIG. 6 is a graph showing a relation between t3 and the air flow rate.

Further, the ranges of "a", "b" and t3 were determined, and the middle values obtained successively through experiments were used. According to the thus-obtained results, as shown in the graphs of FIGS. 4 and 5, the value of "a" was 38 to 43°, the value of "b" was 11 to 15°, and neither whistle noise nor surging noise occurred. Further, as shown in the graph of FIG. 6, neither whistle noise nor surging noise occurred when a concave surface such that the value of t3 was 9 to 15 mm corresponding to 15 to 25%. of the outer diameter of the cylindrical impeller was formed.

It is to be noted that the preferable values in the determined ranges are the middle values in the respective ranges.

Figure 7:
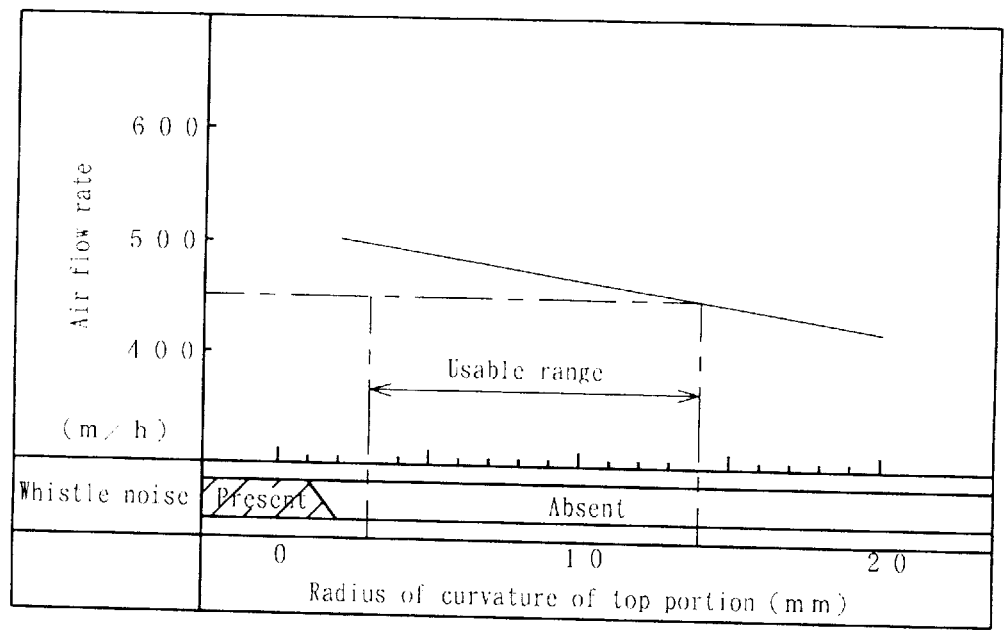
FIG. 7 is a graph for determining a radius of curvature of a top portion.
Figure 8A:
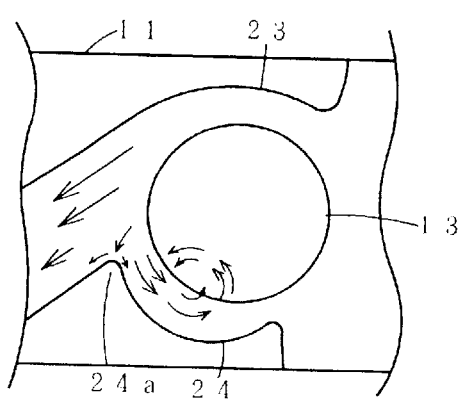
FIGS. 8A and 8B are sectional views showing the states of air flow depending on the radius of curvature of the top portion.
Figure 8B:
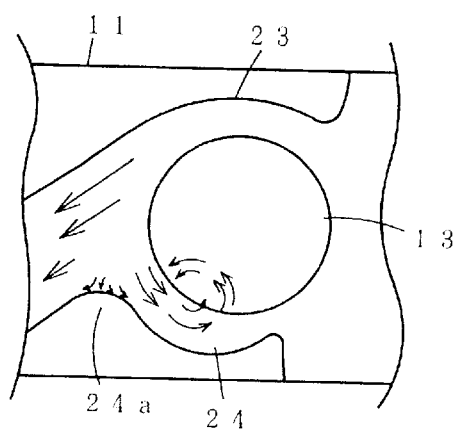

Furthermore, a sectionally arc-shaped portion (referred to as a top portion 24a hereinafter) of the aforementioned stabilizer 24 on the outlet port 17 side is formed so that it protrudes on the air passage side and has a radius of curvature of 3 to 14 mm corresponding to 5 to 23% of the outer diameter of the cylindrical impeller 13 as shown in the graph of FIG. 7. With this arrangement, the air blown by the cylindrical impeller 13 neither generates ventilation noises due to possible collision of it against the top portion 24a (see FIG. 8A, when the radius of curvature is smaller than 3 mm) nor reduces the air flow rate due to possible disturbance of air flow caused by the collision flow (see FIG. 8B, when the radius of curvature exceeds 14 mm).

The rear guide 23 and the stabilizer 24 are comprised of an upper diffuser 25 and a lower diffuser 26 provided pivotally around the respective pivot axes 25a and 26a in a specified extent from the outlet port 17. Both the diffusers 25 and 26 can each be manually changed pivotally in position, and the pivotal positions after the change can be maintained. With this arrangement, when an occupant desires to change the direction of air flow, the occupant is required to manually pivot either one or both of the upper diffuser 25 and the lower diffuser 26. Thus, according to the aforementioned embodiment, by pivoting the upper diffuser 25 or the lower diffuser 26, the direction of the air passage itself can be changed, so that the air smoothly flows along the diffuser 25 or 26. Therefore, no such ventilation noise as observed when the deflecting vane is provided in the air flow is generated.

The air-conditioning equipment for vehicles having the aforementioned construction can be used for the rear seat of, for example, a one-box car or the like. That is, this air-conditioning equipment for vehicles is mounted on the ceiling surface of a vehicle so that it can flow air from the front side to the rear seat side inside the vehicle. Then, in the middle of a cooling cycle comprised of a compressor, a throttle valve, an automobile interior side heat exchanger and an automobile exterior side heat exchanger known conventionally, the evaporator 12 is connected in parallel with the automobile interior side heat exchanger. In this case, it is preferred to provide the automobile interior side heat exchanger with an inlet port (not shown) for taking in the fresh air in addition to the inlet port 16 for taking in air from the front side of the vehicle and make them switchable for the use of either one.

Although the aforementioned air-conditioning equipment for vehicles has been described in regard to the case where it is used for the cooling of the rear seat inside the vehicle, it is a matter of course that it may be used for heating or air cleaning.

Furthermore, although both the upper diffuser 25 and the lower diffuser 26 are constructed so that they can pivot around the respective pivot axes 25a and 26a in the aforementioned embodiment, it is a matter of course that either one may be allowed to pivot.

Furthermore, although both the upper diffuser 25 and the lower diffuser 26 are constructed so that they can pivot independently of each other in the aforementioned embodiment, it is preferable to interlock them. As an interlock structure, there can be considered one in which the upper diffuser 25 and the lower diffuser 26 pivot in an identical direction and one in which they pivot in the mutually opposite directions. For example, they can be constructed as shown in FIGS. 9 and 10.

Figure 9:
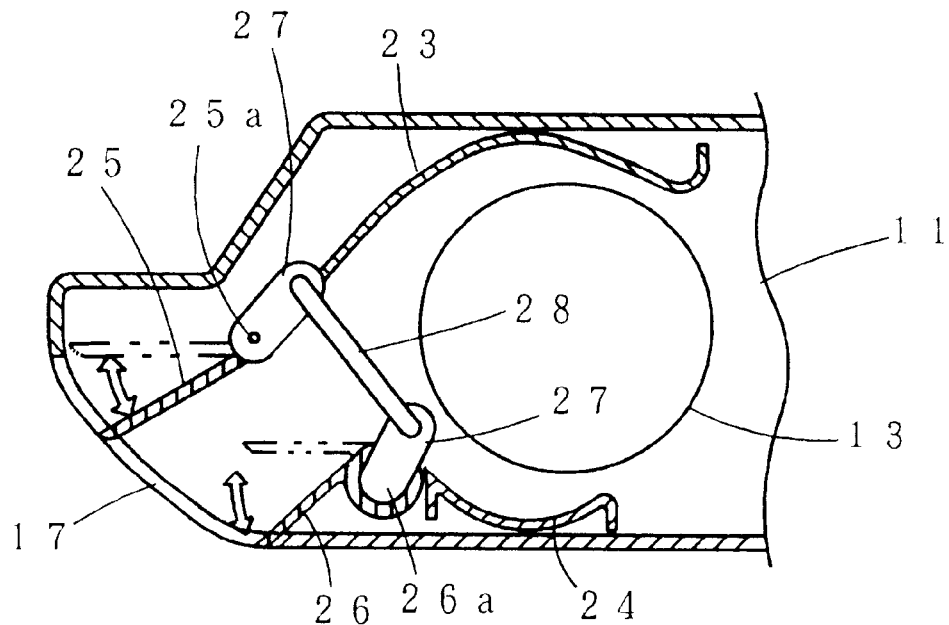
FIG. 9 is a sectional view showing another construction of a rear guide and a stabilizer.
Figure 10:
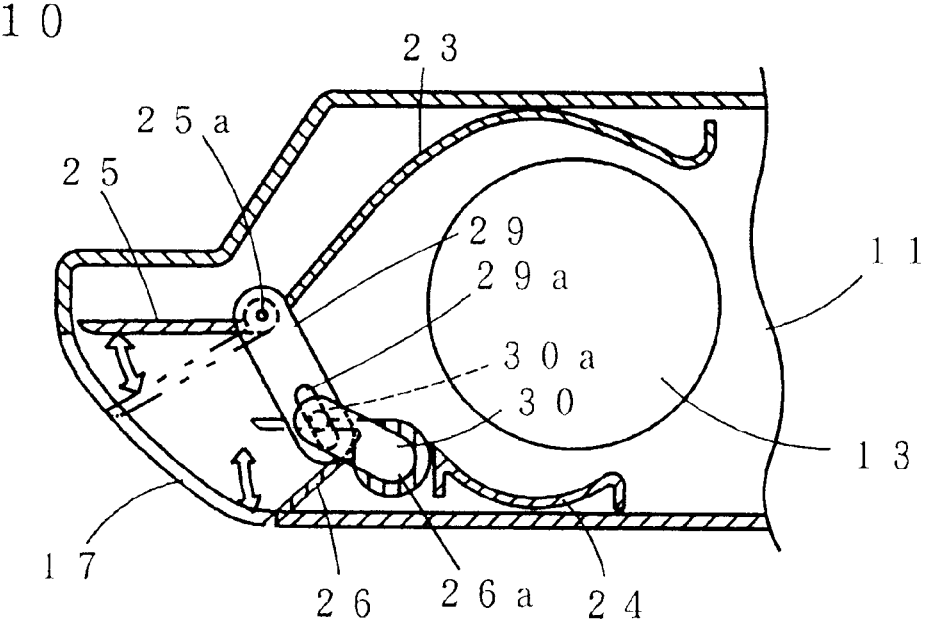
FIG. 10 is a sectional view showing yet another construction of the rear guide and the stabilizer.
Figure 11:
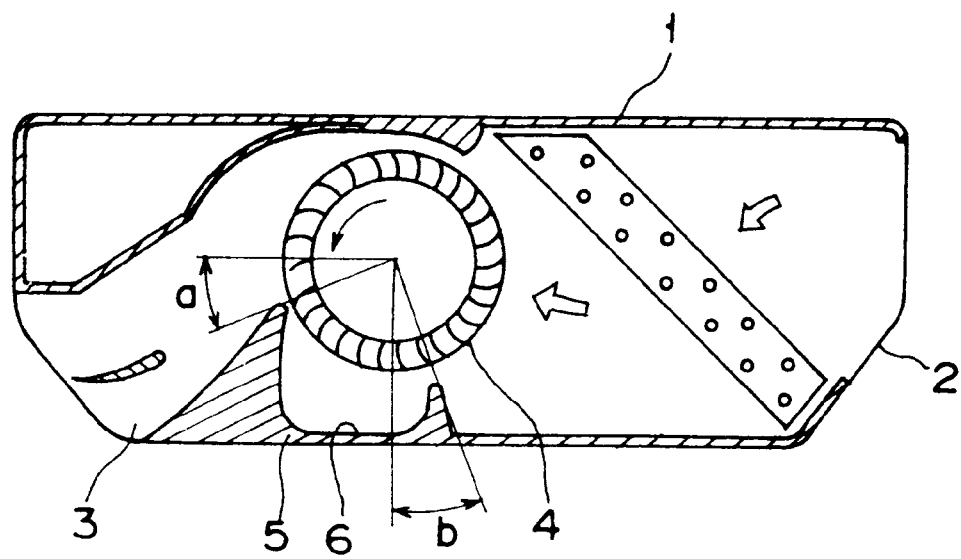
FIG. 11 is a sectional view of prior art air-conditioning equipment for vehicles.

In FIG. 9, pivotal members 27 of which one end is fixed to the pivot axes 25a and 26a of the upper diffuser 25 and the lower diffuser 26 have the other end connected pivotally to both end portions of a connecting rod 28. With this arrangement, by pivoting either one of the diffusers 25 and 26, the other diffuser 26 or 25 pivots via the pivotal members 27 and the connecting rod 28. In FIG. 10, pivotal members 29 and 30 are fixed to the respective pivot axes 25a and 26a of the upper diffuser 25 and the lower diffuser 26. The pivotal member 29 of the upper diffuser 25 is processed with an elongate hole 29a, while the pivotal member 30 of the lower diffuser 26 is provided with a projection 30a that is engaged slidably with the elongate hole 29a. With this arrangement, when one diffuser 25 or 26 pivots and the pivotal member 29 or 30 pivots, the projection 30a slides inside the elongate hole 29a and the other pivotal member 30 or 29 pivots so that the diffusers 25 and 26 come close to each other.

Furthermore, although the upper diffuser 25 and the lower diffuser 26 are pivoted manually in the aforementioned embodiment, it is preferable to make them pivot automatically by means of a motor or the like according to an air flow mode. That is, it is proper to make the diffusers 25 and 26 stop in specified positions (the positions may be either specified positions or arbitrary positions) when the user selects a stop mode and make the diffusers 25 and 26 pivot at a specified speed when each swing mode is selected.

Furthermore, although the upper diffuser 25 and the lower diffuser 26 are each comprised of one plate in the aforementioned embodiment, it is acceptable to divide them into two or more parts in the lengthwise direction and make them pivot around the respective pivot axes independently of each other. With this arrangement, the direction of air flow can be freely selected in each position on the outlet port 17 side, allowing the air-conditioning inside the vehicle to be achieved more favorably.

What is claimed is:

1. Air-conditioning equipment for vehicles, comprising a casing having an inlet port and an outlet port arranged in positions approximately opposite from each other and being internally provided with a cylindrical impeller arranged horizontally perpendicularly to a direction in which said inlet port and said outlet port are connected, a rear guide formed above said cylindrical impeller and a stabilizer formed below said cylindrical impeller, wherein a minimum gap dimension t1 between said cylindrical impeller and said stabilizer on the outlet port side, an angle between a straight line connecting a center of rotation of said cylindrical impeller and a position of the minimum gap dimension t1 on the outlet port side of said stabilizer and a horizontal plane, a minimum gap dimension t2 between said cylindrical impeller and said stabilizer on the inlet port side, an angle between a straight line connecting the center of rotation of said cylindrical impeller and a position of the minimum gap dimension t2 on the inlet port side of said stabilizer and a vertical plane have values chosen to prevent occurrence of a whistle noise and a surging noise, further wherein said dimension t1 is not smaller than 14% and not greater than 24% of an outer diameter of the cylindrical impeller,
   said angle "a" is not smaller than 38° and not greater than 43°,
   said dimension t2 is not smaller than 7% and not greater than 13% of the outer diameter of the cylindrical impeller, and
   said angle "b" is not smaller than 11° and not greater than 15°.

2. The air-conditioning equipment for vehicles according to claim 1, wherein
   said stabilizer has a concave surface which is centered about a position below the center of rotation of the cylindrical impeller in a middle portion except for the outlet port side and the inlet port side and has an arc-like section shape having a radius of curvature smaller than the radius of the cylindrical impeller and a gap of 15% to 25% of the outer diameter of the cylindrical impeller.

3. The air-conditioning equipment for vehicles according to claim 1, wherein
   said stabilizer has a sectionally arc-shaped top portion having a radius of curvature of 5 to 23% of the outer diameter of said cylindrical impeller on the outlet port side.

4. The air-conditioning equipment for vehicles according to claim 1, wherein
   said stabilizer has a concave surface which is centered about a position below the center of rotation of the cylindrical impeller in a middle portion except for the outlet port side and the inlet port side and has an arc-like section shape having a radius of curvature smaller than the radius of the cylindrical impeller and a gap of 15% to 25% of the outer diameter of the cylindrical impeller.

5. The air-conditioning equipment for vehicles according to claim 1, wherein
   said dimension t1 is not smaller than 14% and not greater than 24% of an outer diameter of the cylindrical impeller,
   said angle "a" is not smaller than 38° and not greater than 43°,
   said dimension t2 is not smaller than 7% and not greater than 13% of the outer diameter of the cylindrical impeller, and
   said angle "b" is not smaller than 11° and not greater than 15°,
   said stabilizer has a sectionally arc-shaped top portion having a radius of curvature of 5 to 23% of the outer diameter of said cylindrical impeller on the outlet port side.

6. The air-conditioning equipment for vehicles according to claim 1, wherein
   said stabilizer has a concave surface which is centered about a position below the center of rotation of the cylindrical impeller in a middle portion except for the outlet port side and the inlet port side and has an arc-like section shape having a radius of curvature smaller than the radius of the cylindrical impeller and a gap of 15% to 25% of the outer diameter of the cylindrical impeller, and
   said stabilizer has a sectionally arc-shaped top portion having a radius of curvature of 5 to 23% of the outer diameter of said cylindrical impeller on the outlet port side.

7. The air-conditioning equipment for vehicles according to claim 1, wherein
   said stabilizer has a concave surface which is centered about a position below the center of rotation of the cylindrical impeller in a middle portion except for the outlet port side and the inlet port side and has an arc-like section shape having a radius of curvature smaller than the radius of the cylindrical impeller and a gap of 15% to 25% of the outer diameter of the cylindrical impeller, and
   said stabilizer having a sectionally arc-shaped top portion having a radius of curvature of 5 to 23% of the outer diameter of said cylindrical impeller on the outlet port side.

* * * * *